Figure 1:
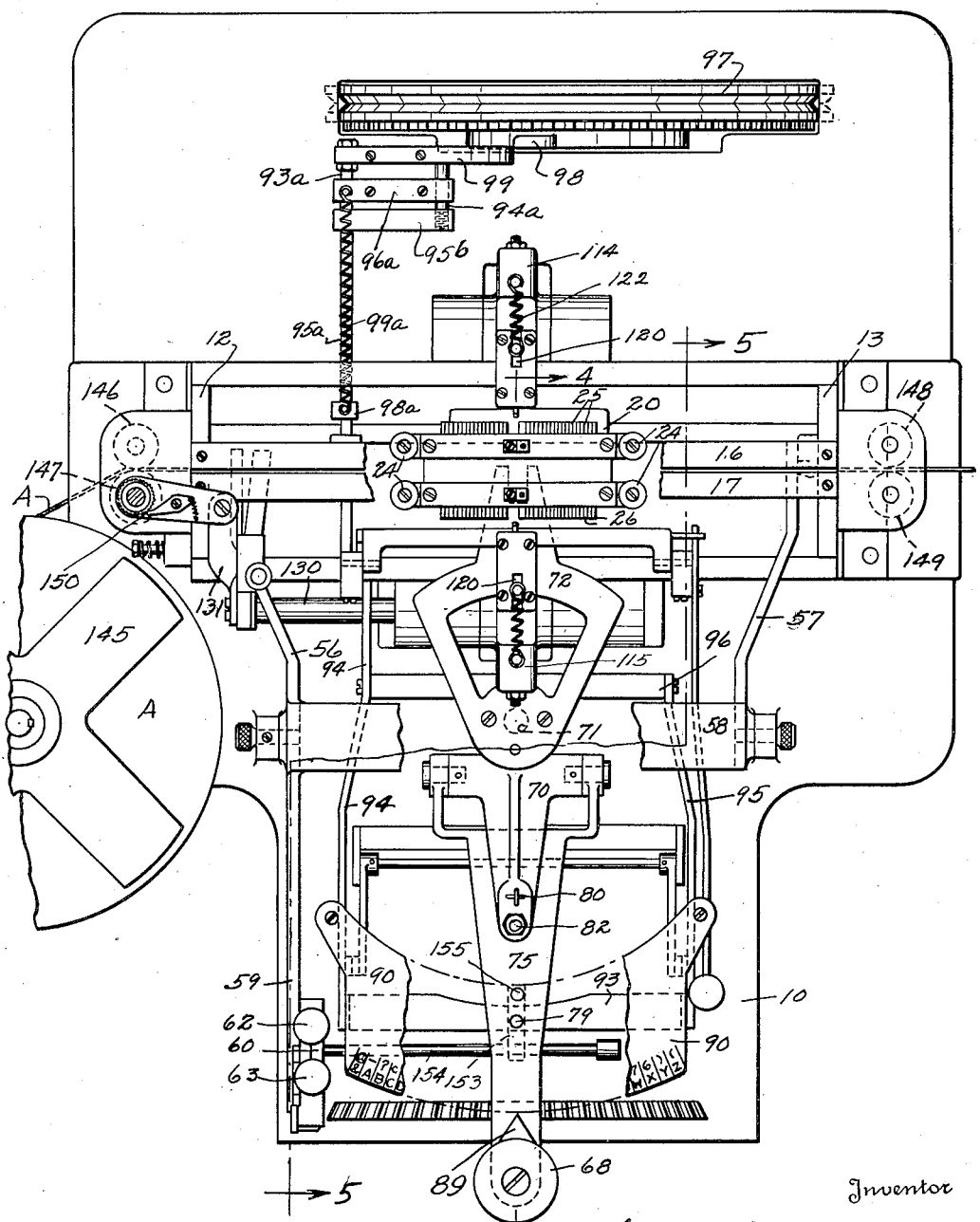

Dec. 10, 1935.  C. CHISHOLM  2,023,464
EMBOSSING MACHINE
Filed Oct. 20, 1932  7 Sheets-Sheet 1

Inventor
Clifton Chisholm,
By Bates, Golnick & Tear
Attorneys

Dec. 10, 1935.     C. CHISHOLM     2,023,464
EMBOSSING MACHINE
Filed Oct. 20, 1932     7 Sheets-Sheet 3

Dec. 10, 1935.   C. CHISHOLM   2,023,464
EMBOSSING MACHINE
Filed Oct. 20, 1932   7 Sheets-Sheet 4
FIG. 4
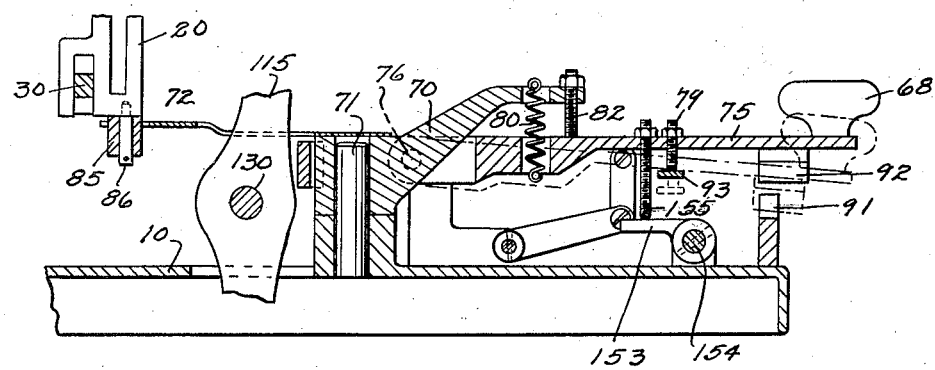
FIG. 5
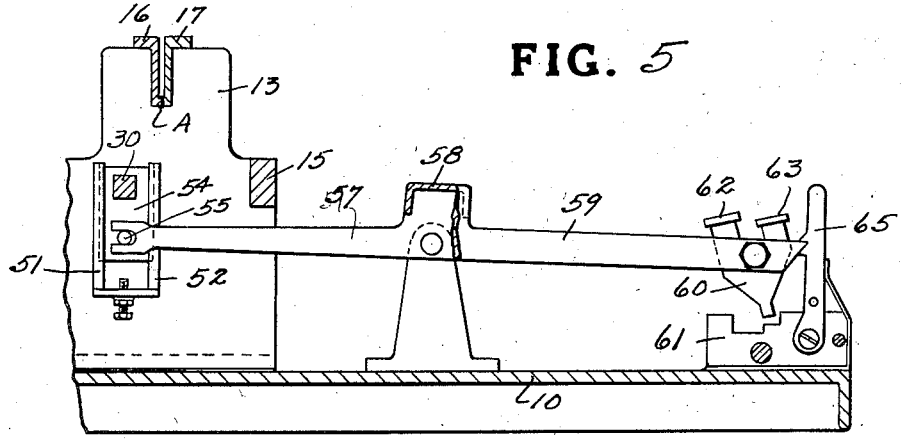
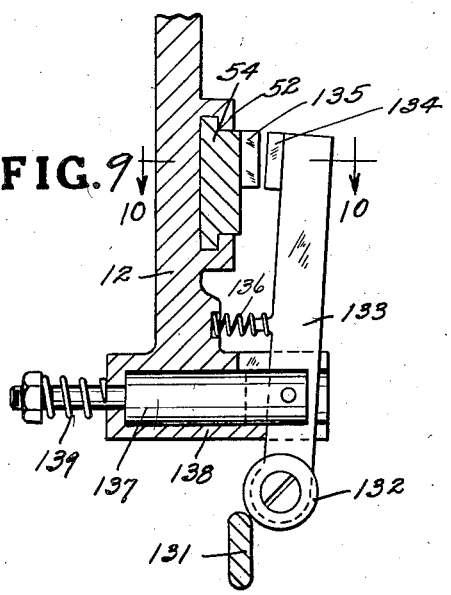
FIG. 10

Dec. 10, 1935.   C. CHISHOLM   2,023,464
EMBOSSING MACHINE
Filed Oct. 20, 1932   7 Sheets-Sheet 5

Dec. 10, 1935.  C. CHISHOLM  2,023,464
EMBOSSING MACHINE
Filed Oct. 20, 1932  7 Sheets-Sheet 6
FIG. 7
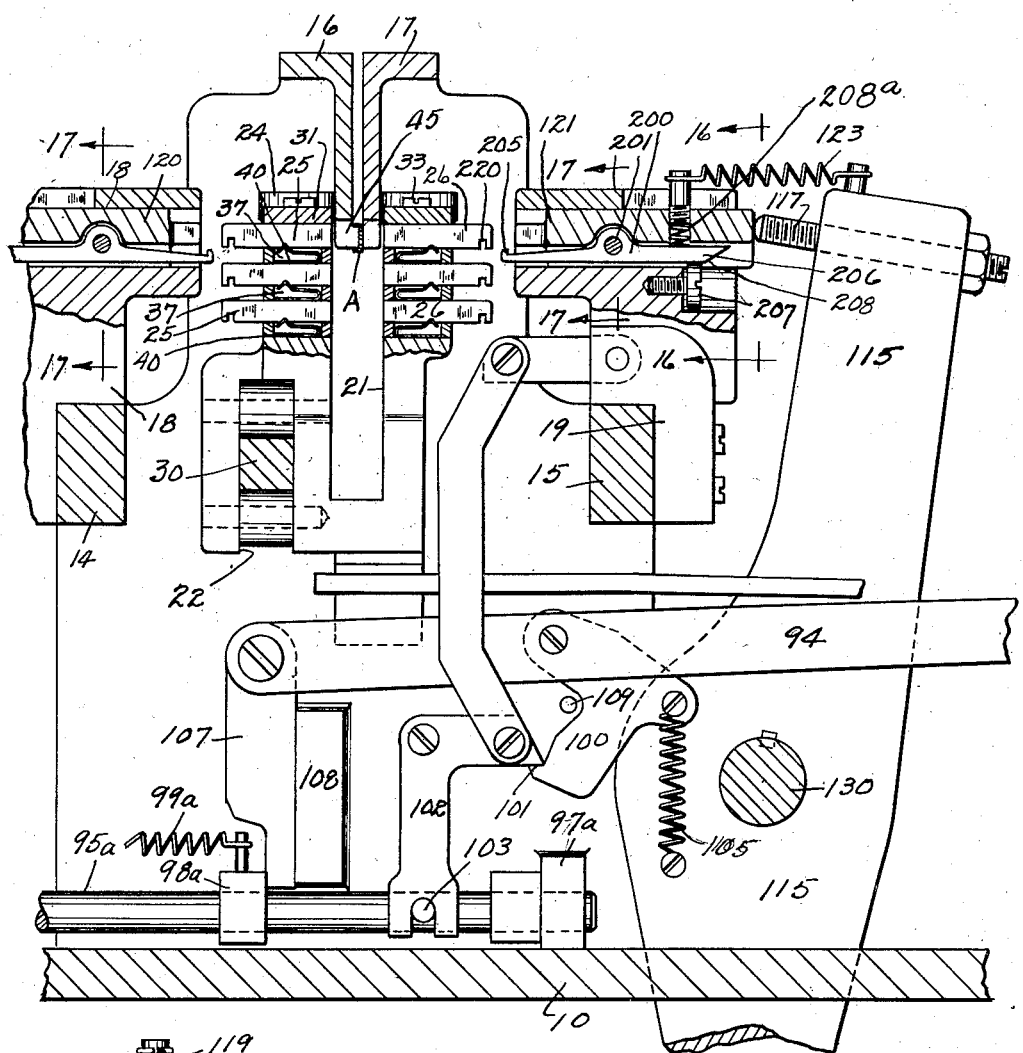
FIG. 16 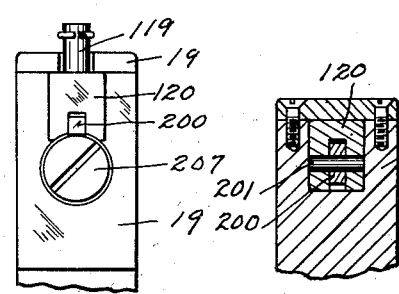 FIG. 17
Inventor
Clifton Chisholm,
By Bates, Goldrick & Hearn
Attorneys Dec. 10, 1935.  C. CHISHOLM  2,023,464
EMBOSSING MACHINE
Filed Oct. 20, 1932  7 Sheets-Sheet 7
FIG. 8
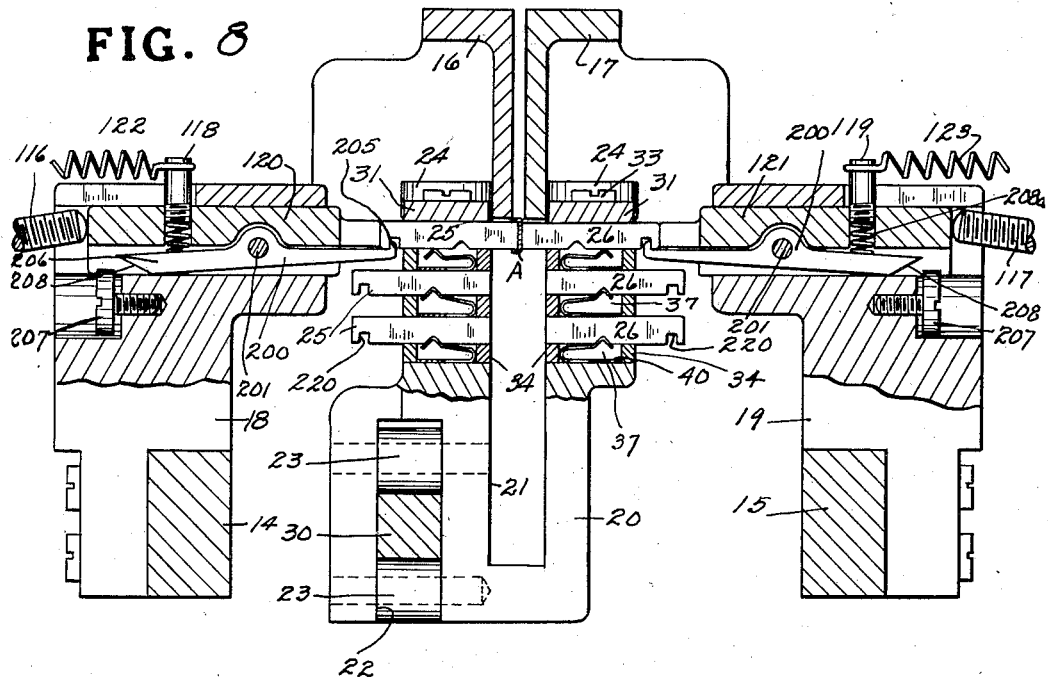
FIG. 15
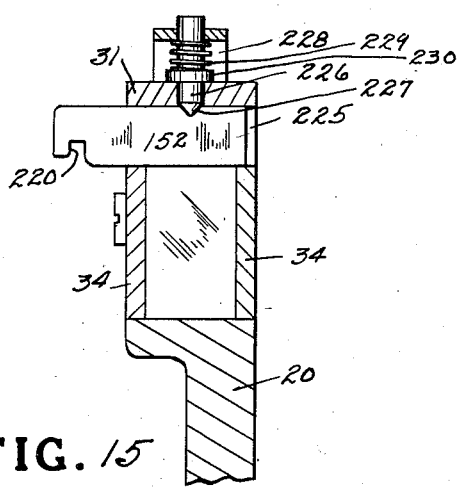
FIG. 12
FIG. 14
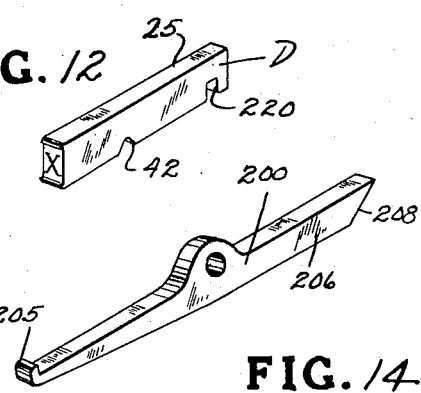
FIG. 13
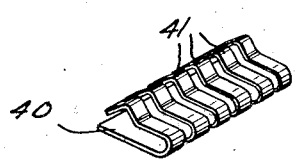
Inventor
Clifton Chisholm,
By Bates, Goldrick & Fears
Attorneys Patented Dec. 10, 1935

2,023,464

UNITED STATES PATENT OFFICE 2,023,464

EMBOSSING MACHINE

Clifton Chisholm, Cleveland, Ohio, assignor to Multigraph Company, Wilmington, Del., a corporation of Delaware Application October 20, 1932, Serial No. 638,717

15 Claims. (Cl. 197—6.2)

My prior Patent No. 1,728,390, issued June 15th, 1929, shows, describes and claims an embossing machine for producing printing strips. That machine has a rectilinearly reciprocable die head carrying a straight row of male dies and an opposing row of female dies, and means for progressing a ribbon of material to be embossed between such rows and lengthwise thereof. The die head is shiftable longitudinally under the control of an actuating lever, which positions the die head and initiates the movement of the selected pair of dies toward each other to emboss the ribbon.

The object of the present invention is to improve the die head and its associated mechanisms, to the end that the dies will be more accessible and readily changeable for replacement, and at the same time to increase the life of the dies and their associated parts. One of the features of the invention is the provision of mechanism independent of the die head itself for withdrawing the dies after the embossing action has been completed.

In the prior patent referred to, several related characters are formed on each die block, and comb springs are used, each finger of which is relied on to retract a given die block. A disadvantage of that construction is that the breakage of any one of the spring fingers interrupts the operation of the whole machine; moreover, when one die block is out of commission none of the characters on it can be used. In the present invention, I form each embossing character on a block of its own, so that if any block is non-effective, it will affect only that character, and I utilize the springs which engage the die blocks only as detents to prevent inadvertent displacement, thus relieving them of the work which is placed on the retracting springs of my former patent.

Other features of the present invention will be apparent from the following detailed description of an approved embodiment thereof.

Figure 2:
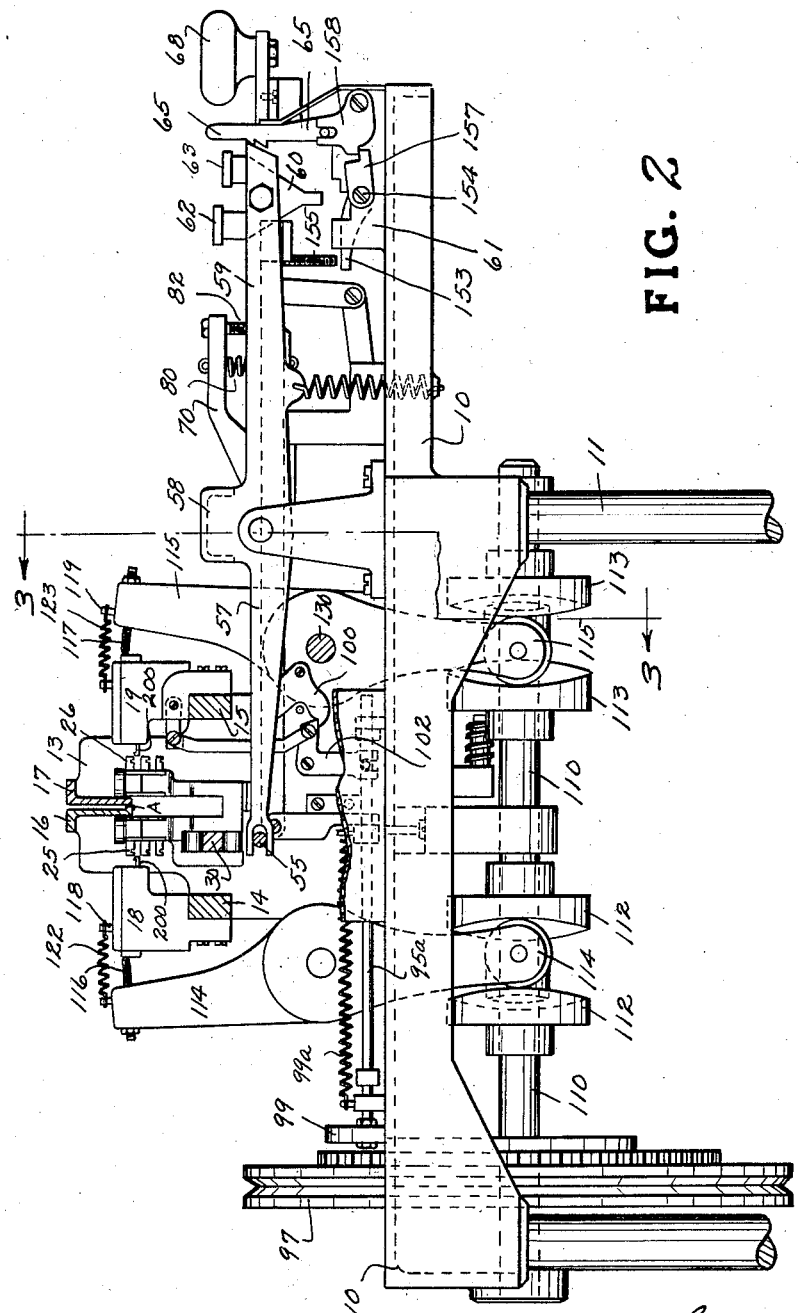
Figure 3:
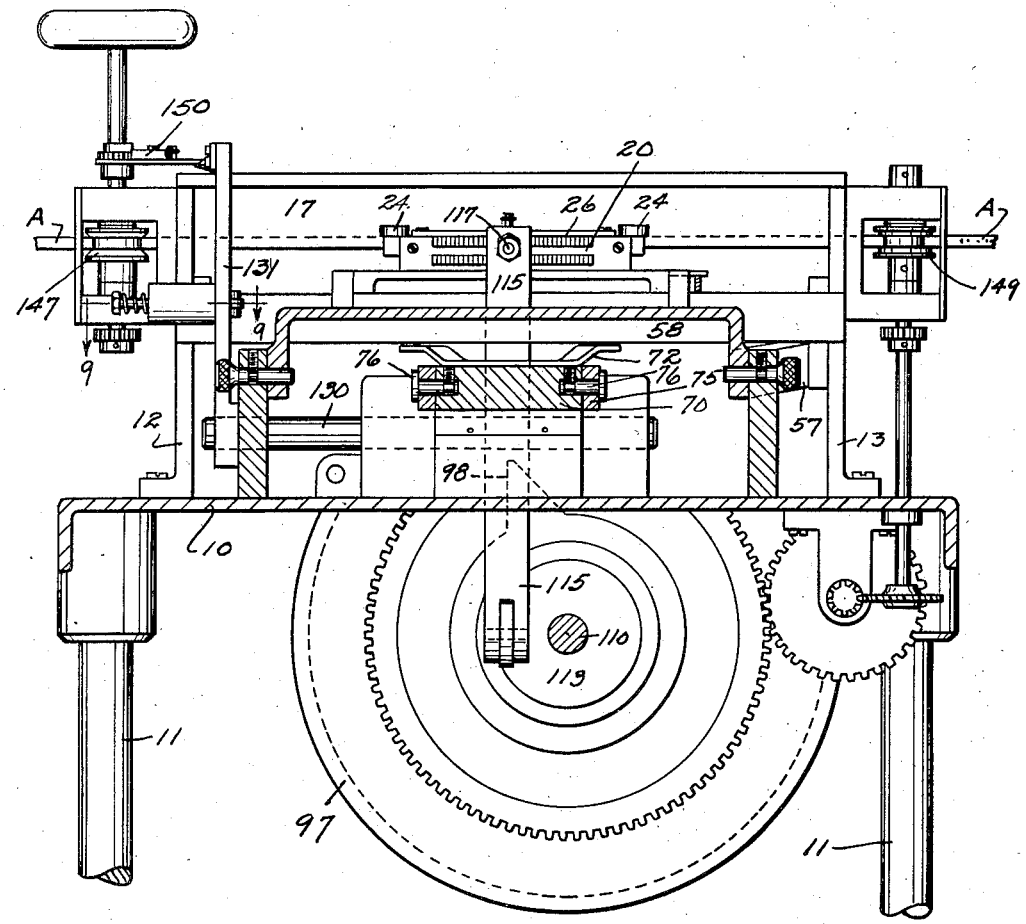
Figure 11:
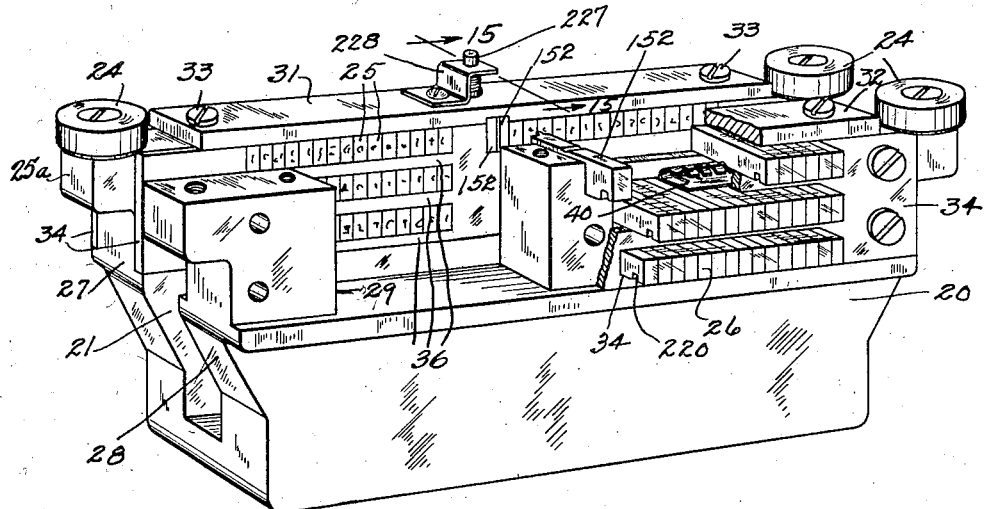
Figure 6:
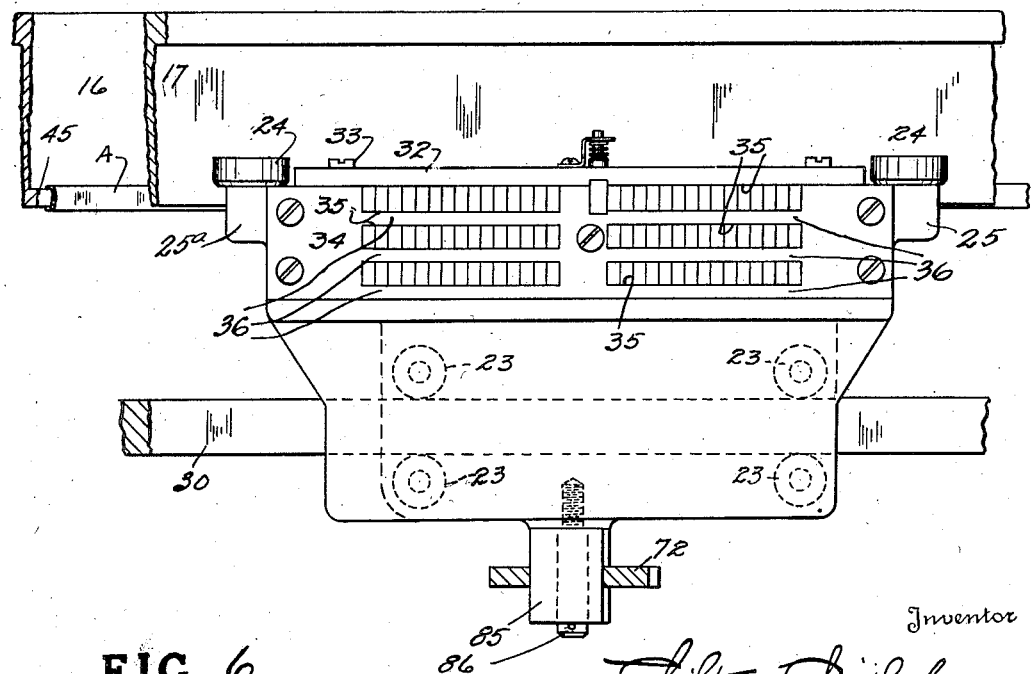

In the drawings, Fig. 1 is a plan partly broken away, of an embossing machine having its die head and associated parts constructed in accordance with the present invention; Fig. 2 is a sectional side elevation thereof looking from the left hand side; Fig. 3 is a vertical cross section substantially on the offset plane indicated by the line 3—3 in Fig. 2; Fig. 4 is a vertical longitudinal central section of the forward portion of the machine; Fig. 5 is a vertical section substantially on the offset plane indicated by the line 5—5 on Fig. 1 and showing parts of the shift mechanism; Fig. 6 is a cross section on an enlarged scale transverse of the machine just in front of the die head; Fig. 7 is a vertical longitudinal section through the die head and adjacent parts, showing some of the cooperating parts in side elevation, this view being in the nature of an enlargement in portion of Fig. 2; Fig. 8 is a view similar to Fig. 7, but illustrating certain of the parts in different position; Fig. 9 is a detail of the indexing mechanism for the die head shaft, being a horizontal section on the line 9—9 in Fig. 3; Fig. 10 is a cross section of the same parts in a plane indicated by the line 10—10 in Fig. 9; Fig. 11 is a perspective view of the die head, partially broken away to illustrate the internal construction thereof; Fig. 12 is a perspective view of a die; Fig. 13 is a perspective view of a comb spring used to maintain the dies in their normal or disengaged position; Fig. 14 is a perspective view of a pawl used to withdraw the dies from their embossing position to their normal position; Fig. 15 is a detail section as indicated by the lines 15—15 on Fig. 11; Fig. 16 is a fragmentary elevation looking in the direction of the arrows on the line 16—16 of Fig. 7; Fig. 17 is a detail section as indicated by the lines 17—17 of Fig. 7.

The frame of the embossing machine in connection with which I have illustrated my invention consists primarily of a horizontal bed plate 10 mounted on suitable legs 11 together with various standards, brackets and ears, secured to the plate and hereinafter described. Two of such frame standards 12 and 13 comprise plates rising from opposite sides of the bed plate and are connected by cross bars 14, 15, 16, and 17. The bars 14 and 15 support stationary housings 18 and 19 for the embossing plungers 120 hereinafter described. The bars 16 and 17 provide a guideway for the ribbon A to be embossed.

My improved die head is generally indicated at 20, and is shown in perspective in Fig. 11, in front elevation in Fig. 6, and in section in Figs. 7 and 8. It comprises a block longitudinally bifurcated above and below; that is to say, that in the upper surface there is a groove 21 enabling the block to embrace the opposite sides of the lower portion of the bars 16 and 17, and in the under side of this die head is a groove 22 whereby the block may straddle a supporting bar 30, which is carried by the brackets 12 and 13, as will be more fully described. The die block carries in the slot 22, two pairs of rollers 23, one roller of each pair riding on top of the bar 30 and the other rollers engaging the under side of the bar.

Mounted on ears 25a, which extend from opposite ends, adjacent the top of the block, are two pairs of rollers 24 which bear against the outer sides of the cross bars 16 and 17.

Each of the legs 27 and 28 of the upper bifurcated portion of the die block carries a set of dies, the leg 27 carrying male dies and the leg 28 carrying the corresponding female dies. As shown in Fig. 11 each of the upstanding legs 27 and 28 are provided with transversely extending recesses 29 which are covered with top plates 31 and 32 secured to the block by suitable screws 33, and at their inner and outer faces with longitudinally slotted cover plates 34.

The plates 34 are each provided with slots 35, which form slideways for the dies. As shown in Figs. 6 and 11, each of the plates has three vertical rows of longitudinally extending slots 35, the bottom of each lowermost slot being slightly above the bottom of the recess 29, while the uppermost slot is open at its top except as closed by the cover plates 31 or 32 heretofore described. Each of the slots 35 is the same height as the dies and of sufficient length to carry several dies in sliding contact with each other. The slots are vertically separated from each other by bars 36 providing chambers 37 in the block between the bottom of the recess 29 and the lowermost row of dies, as well as between each row of dies and the adjacent row.

The chambers 37 carry comb springs 40, which act to retain the dies with their innermost faces flush with the innermost surfaces of the inner cover plates 34. These comb springs are best illustrated in Figs. 11, 7, 8, and 13, and comprise a flat plate of spring metal slotted transversely to provide a series of tines which are bent back substantially parallel with the body of the spring plate and then upwardly and downwardly forming inverted V-shaped latch portions 41.

The springs 40 are placed with their plate portion on the bottom of the recesses 29 or upon the upper surface of the next lower row of dies and are positioned so that the latch portion of each tine engages a notch 42 in the lower surface of each respective die. This latch acts to retain the die in its normal position regardless of vibration or jarring motion imparted to the die block during the operation of the machine, as well as to position the dies accurately upon their return from the embossing position, as will be hereinafter more fully described.

The die head carries three rows of die blocks 25, each block having on the forward end (right hand end, Fig. 8) a male die, and three rows of blocks 26 having on their rear ends corresponding female dies. The latches of the comb springs 40 carried by the die head tend to retain the inner faces of the dies flush with the walls of the groove 21, but at the proper time of operation the plungers 120 in the housings 18 and 19 force the pair of dies, which are centrally positioned toward each other to emboss the interposed metal strip A. This strip in this region is channel-shaped as shown in Fig. 8 and is guided on a rib 45 on the lower portion of the cross bar 16. Such rib and the lower portions of these bars is cut away in the central region of the machine to allow the die blocks to be plunged toward each other.

The supporting bar 30, for the die head, is bodily shiftable vertically into as many different positions as there are vertical rows of dies in the block, and mechanism to thus shift the bar enables the selection of the upper, lower or intermediate die face as desired. The shift mechanism for the die head is best shown in Fig. 5. On the inner face of each of the vertical frame plates 12 and 13 are a pair of guiding ribs 51 and 52 and between the ribs of each pair is a slide 54. The ends of the bar 30 are mounted in these slides. Projecting inwardly from the slides are pins 55. These pins are embraced by the forked inner ends of a pair of rock levers 56 and 57 which are connected by a cross bar 58. A forward extension 59 of the lever 56 provides for the manual operation of the levers 56 and 57 and thus for the raising of the die head, gravity normally holding the die head in its lowermost position with the uppermost face of the dies opposite the ribbon.

I have shown a Y-shaped finger member 60 pivoted to the forward portion of the lever 59. A suitable stepped abutment block 61 is secured to the bed plate 10 beneath this Y-lever. If the operator presses down on the finger button 62 on the rear leg of the Y-lever, this swings forwardly the lower end and such lower end strikes the highest available step on the abutment block, with the result that the die head is lifted only sufficiently to bring the intermediate die characters into line with the ribbon. Upon the other hand, if the operator presses down on the forward finger button 63, the Y-lever is rocked rearwardly and the lever 59 is thus moved downwardly until the Y-lever meets the second step of the abutment block, and this brings the lowermost face of the die opposite the ribbon. A suitable latch 65 (Fig. 5) having a pair of rearwardly facing ratchet teeth, may coact with the forward end of the lever 59 and thus retain such lever in either of its depressed positions.

It is convenient to arrange the die characters in three rows corresponding to upper case, lower case, and numerals and punctuation points. Before the die head is shifted, it is convenient to determine which of the rows is to be used for the character to be embossed, and then the corresponding shift key is depressed or the die head left in its normal position as required.

Any suitable means may be employed for shifting the die head horizontally, such, for instance, as the keyboard and mechanism controlled thereby shown on my prior Patent 1,557,754. However, I have here shown the simpler arrangement for swinging lever, as set out in my patent first mentioned. This lever is a compound device comprising, first, a lever arm 70 on a vertical stationary pivot pin 71 rising from the frame; second, a rearward extension of this lever arm in the form of a plate 72 rigidly secured to the upper end of the hub of the arm and loosely extending around the corresponding embossing lever 115 and its rear end connected with the die head; third, a forwardly extending arm 75 pivoted to the arm 70 on horizontal pivots 76; and fourth, a spring 80, anchored to the arms 70 and 75 and lifting the latter against an adjustable abutment screw 82, carried by the arm 70.

The compound lever just described is swung manually horizontally as a unit about the vertical pivot pin 71. The rear end of the extension 72 is bifurcated and slidably embraces a flat sided block 85 (see Figs. 1, 4, and 6) rotatably mounted on a pin 86 depending from the die head. The forward end of the arm 55 of the compound lever carries a hand knob 68. Accordingly, when this hand knob is grasped by the operator and the lever swung in one direction from another, the die head is moved along the bar 30 to bring the desired pair of dies between the plungers 120.

The arm 75 preferably carries a pointer 89 which stands adjacent to the arcuate edge of an indicating plate 90, extending horizontally above the lever and free from it. The forward edge of this plate is marked with the various characters corresponding to the dies. I have illustrated in Fig. 1 a row of alphabetical characters (which serves as an indication for both the upper and lower case rows of the die head) and behind this a row of punctuation marks, numerals, and special characters, corresponding to the third row of die faces.

When the die head has been brought into the desired position by the lateral movement of the knob as described, the next operation is a downward movement of the knob, which locks the lever and die head in position and initiates the embossing operation. To effect the locking, I provide across the machine beneath the lever arm 75 a stationary comb 91, having upwardly facing notches with beveled entrances, and I provide on the underside of the lever 75 a beveled-edged blade 92 to coact with these notches. The notches in the comb have their walls arranged radially with reference to the pivot pin 71 as shown in Fig. 1. The bevels of the blade and walls of the notches accurately position the die head and hold it locked when the knob is depressed. The dies are preferably equally spaced on the die head,—that is, the die blocks are of equal width and stand one against the other in the die head, as shown in Fig. 6. As the comb 92 is parallel with the path of movement of the die head, it follows that the notches will be equally spaced to cause each notch to correspond to a die block, though as the pivot 71 is further from the comb than from the die, the unit of spacing of the comb will be greater than that of the die.

I will now describe the embossing mechanism per se, which is initiated by the downward movement of the knob 68.

Extending transversely of the machine beneath an adjusting screw 79 on the arm 75 of the compound lever is, as shown in Figs. 4 and 1, a universal bar 93 secured to the forward ends of a pair of arms 94 and 95 pivoted in axial alignment to a bracket 96. The arm 94 extends rearwardly of its pivot and operates to release a single rotation clutch to cause an operation of the embossing mechanism.

The single rotation clutch may be of any approved form. It is illustrated in Fig. 1 as embodied in a main belt pulley 97. The clutch has a shoulder 98 normally engaging a slidable abutment 99 which normally holds the clutch open. When this abutment is drawn forwardly to clear the shoulder 98, the clutch goes into action and makes a single rotation. At the conclusion of the rotation if the abutment has returned to position, the shoulder 98 strikes this abutment and terminates the rotation. This is a usual method of operation of single rotation clutches and it is not deemed necessary to explain it in detail, as any single rotation clutch may be employed, for instance, the clutch shown in my prior Patent #1,557,754.

I prefer to make the abutment 99 in the form of a comparatively stiff leaf spring which provides a shock absorber when the shoulder 98 impinges the abutment at the conclusion of the rotation. This abutment is carried by a pair of rods 94a and 95a, which are connected by a cross-bar 95b. The bars 94a and 95a are slidably mounted in a stationary bracket 96a, secured to the bed plate 10. The rod 93a extends forwardly from the cross bar 95a and near its forward end is guided in a bracket 97a (Fig. 7) rising from the bed plate. Secured to the rod 95a is a collar 98a forming an anchorage for the forward end of a tension spring 99a, the rear end of this spring being connected to the stationary bracket 96a. The spring thus tends to return the abutment 92 into position in the path of the clutch shoulder 98.

Pivotally connected to the trip lever 94 is a dog 100 (Fig. 7). This dog has a shoulder 101 normally beneath the horizontal arm of a bell crank 102 pivoted to a stationary bracket of the machine. The lower end of this bell crank is bifurcated and engages a pin 103 projecting from the rod 95a. A spring 105 anchored to the dog and to some other suitable point, keeps the dog shoulder normally in the position shown in Fig. 7. Pivotally depending from the rear end of the lever 94 is a block 107 normally lying between the collar 98a on the rod 95a and the stationary rib 108 of the frame. This block in this position forms a lock preventing the release of the clutch. However, when the arm 75 of the compound lever is depressed, the concomitant elevation of the rear end of the lever 94 withdraws the lock 107 and by reason of the dog 100 rocks the bell crank 102, drawing the rod 95a forwardly, thereby releasing the single rotation clutch, which causes the embossing operation as present described. The continued upward movement of the rear end of the arm 94 causes an inclined edge of the dog 100 to engage a stationary pin 109 (Fig. 7) which cams the dog out of engagement with the bell crank 102 and this releases the clutch rod 95a so that it returns to position, bringing the abutment 99 into the path of the clutch lug 98. When the lever 94 returns to normal position, consequent upon the operator removing the pressure from the knob 88, the locking block 107 descends between the collar 108a and the rib 108 and thereby locks the clutch release.

When the clutch has been released as above described, its operation is to give a single rotation to the cam shaft 110 (Fig. 2). On this shaft are a pair of grooved cams 112 and 113 which coact with the lower ends of a pair of levers 114 and 115. Each lever carries near its upper end an adjustable abutment pin 116 and 117 which is designed to coact with the corresponding plunger 120 and 121, heretofore referred to in the housings 18 and 19. The plungers are normally held back from the die head by springs 122 and 123, one end of each of which is secured to its respective arm 114 or 115 and the other end to a pin 118 or 119 carried by its respective plunger 120.

When the die head has been positioned, the selected dies are directly between the inner ends of the two plungers, and, accordingly the operation of the cams 112 and 113 rocking inwardly the upper ends of the embossing levers, cause these plungers to shove the dies 25 and 26 toward each other, thus embossing the interposed strip A.

Before the plungers engage the die blocks, an accurate locking of the die head in its selected elevation, as controlled by the shift, takes place, thus insuring proper horizontal alignment of characters. The mechanism for effecting this is best shown in Figs. 2, 9, and 10. The embossing lever 115 is rigid on a rock shaft 130, which carries a rock arm 131 Figs. 1, 9, and 10 which at the beginning of the movement of the lever 115 engages a roller 132 on a lever 133 pivotally carried by the standard 12. The rear end of this lever has a beveled face 134, which is designed to enter any of three notches 135 on the slide 54, according to the vertical position of such slide, as given by the shift key. This accurately locks the elevation and maintains it until the embossing action is completed. On a return stroke of the embossing arm a spring 136 returns the lever 133 to normal position. To prevent strain on the parts the lever 133 is not pivoted positively to the standard 12, but to a plunger 137 mounted in a housing 138 formed on such standard, the plunger being normally maintained seated in the housing by a stiff spring 139.

Comment has been made that the rearward extension 72 of the compound main lever is of sector shape with an opening of considerable extent through it. It is through this opening that the forward embossing lever 115 extends. The opening enables the oscillating hand lever to clear the embossing lever in all positions of either lever.

During the second half of the rotation of the cams 112 and 113, the embossing levers are rocked in the opposite direction to their embossing movement, and the springs 122 and 123 withdraw the plungers, which in turn act to withdraw the dies by mechanism about to be described.

As the plungers 120 are struck by their respective embossing levers and shoved toward their respective dies 25 and 26, which have previously been positioned in alignment with the plungers, they carry with them respective pawls 200. Each pawl is pivotally mounted on a pin 201, so as to enable it to swing in a vertical plane, in a longitudinally extending slot in its respective plunger.

When the plungers 120 are in their normal or withdrawn positions, as shown in Fig. 7, each pawl extends beyond the inner face of its plunger toward the die block. The outer end of each pawl 200 is provided with an upwardly extending hook 205 arranged to engage notches 220 in the dies to withdraw them as the plunger withdraws.

As the plunger is shoved toward the die, and when the hook 205 of its respective pawl 200 reaches a position immediately beneath the notch 220 in the die which is in alignment with the plunger, the rearmost end 206 of the pawl is carried past an abutment, such as the head of a set screw 207, and a compression spring 208a, carried by the plunger, forces the hook 205 into the notch 220 of the die. Further movement of the plunger causes the nose thereof to abut the die and thus shove that die towards its coacting die to emboss the ribbon A.

As soon as the ribbon is embossed, the embossing levers return, withdrawing the plungers 120, the pawls 200 and the dies, to which the pawls are hooked. When the lever 114 or 115 returns, a spring 123, interposed between the lever and its respective plunger 120, retains the plunger in contact with the abutment pin 117, carried by the embossing lever, thereby withdrawing the plunger and its associated pawl 200. The pawl, which is still in engagement with the die, withdraws the latter. However, when the die has been withdrawn to its normal or rest position, the beveled surface 208 of the pawl engages the abutment 207 and causes the pawl to be cammed, swinging the hook 205 out of engagement with the die.

Immediately before the die reaches its withdrawn position, the V-notch 42 of the die, is engaged by its respective spring tine 41 and cammed into position, thereby relieving the pressure between the pawl and the die at the time of disengagement of the hook 205 from the notch 220 in the die.

The ribbon of material A is shown as fed from a supply thereof, on a reel 145, along a path transversely of the machine where it is embossed, cut off and finally delivered. The ribbon passes first between a pair of rolls 146 and 147 which not only feed the ribbon but flange the edges of it so that it becomes channel shaped, whereby it is guided by the rib 29 on the cross bar 16. The ribbon is delivered by a pair of rolls 148 and 149 which bend in the edges of the channel shaped strip so that it is suitable for mounting over the projections of a holder.

The mechanisms for effecting the ribbon feed is substantially the same as that shown in my prior patents mentioned, and need not here be more fully described further than to say that the roller 147 is connected by a ratchet mechanism 150 with the arm 131 on the rock shaft 130 on which the embossing lever 115 is mounted, so that on the back stroke of the embossing lever, the ribbon is fed forwardly a distance corresponding to one character. The discharging rollers 148 and 149 are continuously rotated by being suitably geared with the main pulley and operate to bend in the flanged edges and discharge the cut off strip whenever it is shoved into the bite of these rollers.

The shearing of the embossed portion of the strip from the following portion is effected by a pair of shearing dies 152 in the die head, controlled by the operation of the knob 68 in a particular position. That is to say, when the lateral movement of this knob has brought the dies 153 between the plungers 120 and 121, then the downward movement of the knob causes the operation already described of the embossing mechanism to effect the shearing similarly to the operation of an ordinary character die. It will be noticed, however, that the shearing dies are provided only in the upper row of characters and hence to shear this strip it is necessary that the die head be in its lowermost position.

The shearing dies are mounted in recesses 225 in the die block and are retained in their withdrawn position by bevelled nosed plungers 226 (Figs. 11 and 15) which engage V shaped notches 227 in the upper surfaces of the dies. The plungers are slidably mounted in the top plates 31 of the die block and suitable bearing brackets 228, carried by such plates. Compression springs 229 act on enlargements 230 of the plungers and retain them in contact with respective dies. Each shearing die is provided with a notch 220, similar in all respects to the notches 220 in the embossing dies, and the withdrawal of the shearing die is accomplished in the same manner as heretofore described in connection with the embossing dies.

To prevent any attempted shearing when the die head is in either of its shifted positions, I may provide an interlock between the shift mechanism and the shearing mechanism, such as shown in Figs. 1, 2, and 4. Thus, the arm 75 of the compound lever carries an adjustable pin 155 which is normally idle, but when the lever is in the shearing position stands directly over an arm 153 on a rock shaft 154. The shaft carries a dog 157 (Fig. 2) which lies beneath a shoulder on a dog 158, which is connected with the shift latch 65. Accordingly, the first downward movement of the knob 68 in a shearing position withdraws the latch 65 so that if the die head were in either of its elevated positions, it would immediately drop by gravity and would thus be in shearing position before the released embossing mechanism begins to act.

It will be seen that by the present arrangements, I have greatly simplified the die head, to the end that the dies are readily replaceable. I have arranged the die head so that the dies may be readily withdrawn by the operator without removing or replacing any other parts of the mechanism, thereby greatly reducing the time used to make such replacements and permitting the standard dies to be changed to dies carrying special characters with little loss of operating time. There is very little work thrown on the tines of the comb springs, so that they will last indefinitely. Moreover, if a tine should break, no damage results, as the plunger pawl is still effective to withdraw the die.

It will also be noticed that the springs which act to withdraw the dies, namely, the plunger-withdrawing springs, are now located in unconfined regions, as shown in Fig. 2, so that they may readily be made of ample size to provide any withdrawing force necessary. If either of them should break, it can be readily replaced without requiring any dismantling of the machine.

I claim:

1. In an embossing machine, the combination of a die head carrying a plurality of sets of dies, one set above the other, separated by intervening space, and a comb spring in such space having a continuous body portion resting on one set of dies and individual spring fingers engaging the dies of the other set.

2. In an embossing machine, the combination of a reciprocatory die head carrying coacting sets of male and female dies, slidable plunger heads having plungers adapted to engage the outer ends of dies positioned between the plungers, means for shoving said plunger heads toward each other to move the selected dies to emboss interposed material, retracting springs connected to the plunger heads, die-withdrawing hooks carried by the plunger heads, means for causing said hooks to engage the dies as the plungers move to active position, and means for moving the hooks to free the dies when the retractile springs withdraw the plunger heads to idle position, whereby said retractile springs provide motive power for withdrawing the dies.

3. In an embossing machine, the combination of a horizontally reciprocable die head having dies mounted therein side by side and movable longitudinally toward each other to emboss interposed material, manually controlled means for positioning such die head, a pair of slidable plunger heads on opposite sides of the die head, a die withdrawing device carried by each plunger head, detent springs engaging the individual dies and adapted to retain them against inadvertent movement when in their withdrawn position, power mechanism for shoving the plunger heads toward each other to effect the embossing and also to cause the withdrawing devices to engage the dies, and means for withdrawing the plunger heads while the withdrawing devices engage the dies, and for moving the withdrawing devices laterally to cause them to become free from the dies at the end of the withdrawing movement.

4. In an embossing machine, the combination of a horizontally reciprocable die head having coacting male and female dies mounted therein in two sets facing each other, said dies being movable longitudinally toward each other to emboss interposed material, mechanism for feeding such material step by step, a pair of slidable plunger heads on opposite sides of the die head, a die withdrawing device carried by each plunger head, mechanism for shoving the plunger heads forcibly toward each other to effect the embossing and also to cause the withdrawing devices to engage the dies, and means for withdrawing the plunger heads while the withdrawing devices engage the dies, and for moving the withdrawing devices to cause them to become free from the dies at the end of the withdrawing movement.

5. In an embossing machine, the combination of a die head having tiers of sets of cooperating dies, springs between the respective tiers coacting with the dies to retain them when in withdrawn position, each die having a notch in its outer portion, a pair of movable plunger heads having plungers adapted to engage the dies, shifting mechanism for moving the die head in one direction to select the set of dies which is to be between the plungers, means for moving the die head in another direction to select a pair of dies in the set, mechanism for forcibly pushing the plunger heads toward each other to effect the embossing, hooks on the plunger heads, springs acting on said hooks to cause them to enter the notches of the dies as the plunger heads are moved toward each other, springs acting on the plunger heads to withdraw them, means for camming the hooks out of the notches as the heads withdraw, and springs between the tiers of dies coacting with recesses in the dies to hold them in withdrawn position.

6. The combination of a die head, a set of dies arranged side by side in a straight row in the die head, and a comb spring within the die head and having a common base portion and individual fingers bent backwardly over the base, the base portion extending in the direction of the row and the individual fingers frictionally engaging the respective dies, and means to positively force the dies toward active position and to positively withdraw them.

7. The combination of a die head, a set of dies therein arranged side by side in a straight row, means for moving the dies in active direction, means for withdrawing the dies, and a comb spring comprising a continuous base portion extending in the direction of a row of dies and having individual spring fingers bent over from the base portion substantially to make a U with the base, each finger having an intermediate hump adapted to engage a notch in a corresponding die.

8. In an embossing machine, the combination of a reciprocable die head, cooperating sets of male and female dies mounted therein, each provided with a rigid shoulder, movable plungers mounted extraneously of the head for forcing said dies toward each other to engage interposed material, hooks adapted to engage said shoulders on the dies and withdraw the same as the plungers move to idle position, and mechanism for disengaging the hooks from the dies without shifting the set of dies.

9. In an embossing machine, the combination of a horizontally movable die head having coacting pairs of horizontally movable dies mounted in said head and facing each other and adapted to remain in the position into which the mechanism moves them, plungers slidably mounted extraneously of the head, means for moving said plungers toward each other to actuate the dies to effect the embossing, and mechanism operated concurrently with the withdrawing movement of the plunger to positively withdraw the dies, said mechanism then automatically freeing itself from the dies and continuing its movement.

10. In an embossing machine, the combination of a die head carrying a plurality of sets of dies, one set above the other separated by intervening space, each die having a notch, a plunger slidably mounted outside of the die head and adapted to engage the end of the die, said plunger having a pivoted hook adapted to enter the intervening space and engage a die, means for freeing the hook upon withdrawal of the die, and means for raising and lowering the die head to present a different set of dies to the plunger.

11. In an embossing machine, the combination of a horizontally reciprocating die head, a plurality of sets of dies in said head, said sets being arranged one over the other, a movable plunger mounted extraneously of the die head and beyond the outer ends of the dies, means for moving the die head vertically to present different sets of dies to the plunger and horizontally to present different dies in a set, and withdrawing means carried by the plunger and adapted to engage the dies of any set.

12. In an embossing machine, the combination with a set of male dies arranged in a straight row, a cooperating set of female dies arranged in a straight row, plungers adapted to push said dies toward each other to effect the embossing, a pair of combs, each having a continuous base with a number of spring fingers, each finger frictionally engaging one of the dies, and means for positively withdrawing the dies following the embossing.

13. In an embossing machine, the combination of a die head, a series of dies side by side mounted therein in a straight row and each provided with a notch, mechanism for shoving any die to active position, mechanism for withdrawing such die, and a comb extending across the various dies and having a continuous straight base with spring fingers bent therefrom to overlie the base, one finger coacting with each die, each finger being bent into an approximate V-shape to enter the corresponding notch of the die when withdrawn.

14. In an embossing machine, the combination of a die head carrying a plurality of sets of dies, the sets arranged parallel with each other and separated by intervening space, and springs in such space acting on the individual dies.

15. The combination of a die head, a set of dies arranged side by side in a straight row in the die head, a second set of dies in the die head arranged in a straight row alongside of the first row, springs housed within the die head between the rows and acting on the individual dies, of one row, and means to positively force the dies toward active position and positively withdraw them from active position.

CLIFTON CHISHOLM.